Dec. 23, 1947.   A. L. JENNINGS   2,432,993
METHOD OF INDENTING FELT PAPER
Filed Dec. 30, 1943

Inventor
Arthur L. Jennings
by
Walter J. Kaufman
Attorney

Patented Dec. 23, 1947

2,432,993

UNITED STATES PATENT OFFICE 2,432,993

METHOD OF INDENTING FELT PAPER

Arthur L. Jennings, Lancaster, Pa., assignor to Armstrong Cork Company, Lancaster, Pa., a corporation of Pennsylvania Application December 30, 1943, Serial No. 516,179

6 Claims. (Cl. 101—32)

My invention relates to a method of indenting felt paper and more particularly to a method whereby a light porous highly absorbent felt containing a relatively small amount of the dried residue of rubber latex may be indented in limited areas to a substantial depth without crazing or rupturing of the felt of the intermediate unindented areas. The invention will find particular usefulness in the manufacture of advertising display cards, automobile trim material and in other fields where a lightweight material having an appearance of considerable depth or thickness may be useful.

Heretofore in the manufacture of trim materials for automobiles and other similar uses, common practice has been to take a base sheet of felt paper and adhesively secure to the base cut-out pieces of felt paper constituting the raised areas in the finished product. A covering of trim fabric is applied over the felt paper base and the upstanding portions of overlaid material, the fabric being sewed directly through the felt paper base around the periphery of the overlaid pieces. This system of fabrication is expensive and the effect produced is not as desirable as that obtainable with the present invention. It has been proposed also to impregnate a felt paper sheet with rubber latex, dry the sheet, and then indent with a heated press. This process does not permit the obtaining of deep impressions without rupture of the upper surface of the unindented areas, particularly where such areas are of limited width. The felt prior to indenting must be of a heavy gauge in order to give the desired appearance of great depth or thickness. It must be at the same time light in weight. Consequently, it possesses little strength. Attempts to overcome this rupture of the lightweight, low strength felt have been directed along the line of incorporating extremely flexible impregnants in relatively large quantities but here cost is such a major factor that such processes have not been found commercially acceptable.

It is an object of my invention to provide a simple method whereby lightweight felts in the order of 9 to 15 pounds per cubic foot density may be deeply indented without rupture of unindented portions, even though such unindented portions be relatively narrow.

Another object is to provide a method which will make possible deep impression indenting without rupture and which will result in a rigid, self-sustaining product of considerable strength effected by establishing an area of high density in the sheet surrounding the thick unindented areas.

I accomplish my purpose by taking a light-density felt such as a rag felt as it is supplied by the felt manufacturer and impregnate it with a very limited amount of rubber latex. I prefer to incorporate between .52 and 2.75 pounds per cubic foot of rubber latex (on a dry basis) and in no event less than .5 or greater than 3.5 pounds. I distribute this uniformly throughout the thickness of the sheet and then dry. Thereafter I apply moisture to the upper surface of the sheet. This may be accomplished by a spray gun or brush. Substantially immediately after wetting, the material is fed to a heated press which is effective for converting the moisture to steam. This not only softens the latex deposited in the felt but also softens the felt itself and makes it susceptible to deep indentation without any tendency for crazing or rupture at the upper unindented portions, at the same time bonding the fibers in the indented areas into a relatively dense, strong body, reinforcing the unindented areas and making the formed sheet stiff and self-sustaining.

In order that my invention may be more readily understood, I will describe the same in connection with the attached drawing in which.

Figure 1:
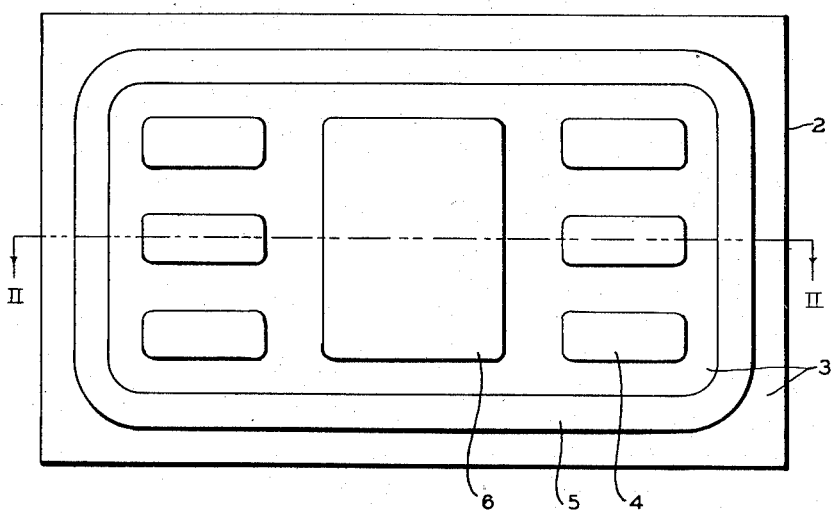
Figure 1 is a plan view showing an automobile body trim member.

Referring to Figure 1 which illustrates a typical trim member, the body felt is indicated at 2 and has depressed or indented portions 3 with raised portions 4, 5, and 6. It will be noted that the raised or unindented portions 4 and 5 are relatively narrow and under normal manufacturing procedure, there would be considerable tendency for the upper surface of such portions to craze or rupture. In the embodiment illustrated, the felt paper web is formed as a waterlaid web of rag felt containing a substantial quantity of light, fluffy fibers such as cotton, kapok or the like effective for producing an open, porous, lightweight web. The web has a density in this case in the order of about 70 pounds, determined on a ream basis of 480 square feet, and has a thickness of about .150" to .175". This felt web as initially prepared contains no binder but is inter-felted so as to be form-retaining and self-sustaining. The web as thus prepared is fed to an impregnating bath containing a highly diluted rubber latex containing in the order of 5% of solids. The felt is passed through the bath and dried, leaving in the felt from 3 to 15 grams per square foot of the dried residue of the rubber latex which is distributed substantially uniformly throughout the thickness of the web.

Figure 2:
Figure 2 is a sectional view on a line 2—2 of Figure 1.

The web is then cut to the desired general shape; in the embodiment illustrated in Figures 1 and 2 this is rectangular. Moisture is then applied to the upper surface of the piece. This is accomplished preferably by means of an atomizing spray and only a small amount of moisture is needed at the upper surface for it is flashed into steam and permeates throughout the thickness of open porous felt very rapidly. In accordance with my preferred practice, the felt substantially immediately upon being wetted at the upper surface is positioned in an indenting press, the upper platen of which is heated to a temperature above 212° F. and preferably below 300° F. Satisfactory results are obtained when the upper platen is heated to about 250° F. The lower platen is not heated, although it may be, if desired.

Figure 3:
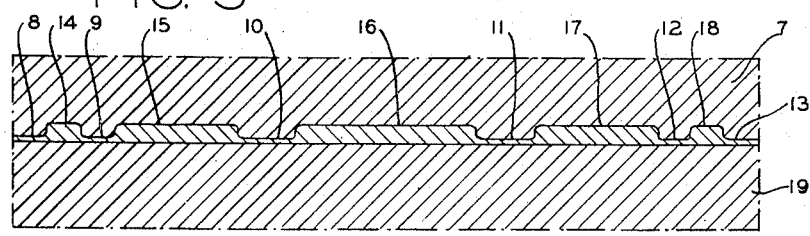
Figure 3 is a sectional view schematically showing a pair of press platens with the indented material disposed therein.

The press is schematically illustrated in closed position in Figure 3. It will be noted that the upper platen 7 is provided with projections 8, 9, 10, 11, 12, and 13 which are effective for indenting the felt in limited areas only. The platen is provided with recesses 14, 15, 16, 17, and 18 which accommodate the unindented or raised portions of the felt, with the line where the unindented portions merge into the indented portions being generally rounded. It is preferred to have the upper platen so arranged that it is directly engageable with substantially the entire upper surface area of the felt so that heat is supplied throughout the extent of the upper surface of the sheet for effecting softening of the felt and the rubber. The lower platen 19 of the press is flat surfaced in those instances where it is desired to have a smooth lower surface on the finished article.

The heat of the press is sufficient to substantially instantaneously convert the small amount of water which is present at the upper surface into steam and this steam permeates substantially the entire thickness of the felt, softening the latex and felt and permitting relatively deep indentation without rupture of the unindented portions. I have successfully indented felt paper having an initial thickness of .150" to .175" and a density of about 11.5 pounds per cubic foot with narrow unindented areas in the neighborhood of ½" wide, compressing the indented portion to a thickness of about .040". This is about as severe a test as would be encountered in actual manufacture for, ordinarily, the indenting will not be so extensive. Generally, a difference in level of .100" between the indented and unindented portions is all that is required to give a good effect with the desired "pillowed" appearance. Even though the amount of latex in the sheet is relatively slight, in the neighborhood of 3 to 15 grams per square foot in the example given above, nevertheless, upon the application of moisture and heat under the conditions of operation of this invention, I obtain a satisfactory bonding of the fibers into a relatively rigid panel with a good unbroken surface in both the indented and unindented areas. The rigidity of the indented areas makes the panel self-sustaining and capable of satisfactorily receiving fastenings such as upholstery tacks.

In place of natural rubber latex as used above, synthetic rubber latex may be used and where the term rubber latex is used, I comprehend the use of either natural or synthetic rubber latex or both. The nature of the felt paper is not critical but must be formed of such raw materials as will give a lightweight, open, porous sheet having great bulk which will permit deep indentation. Water-laid rag felt is preferred for obvious reasons but dry-laid felts may be used. The amount of water used prior to pressing should be kept at the very minimum for if an excess of water is used, there is some tendency for the felt to blister due to the creation of too great a quantity of steam within the sheet. If an atomizing spray is passed slowly over the sheet a single time, sufficient water will be applied for most purposes. This can be readily determined by the sprayer after pressing the first sheet. If too much water is applied, it will be necessary to dry out the sheets by exposure to air prior to pressing.

The finished product may be painted or decorated where used for an advertising display card for example. If the material is to be used as a trim for automobile or plane interiors, a trim fabric may be applied over the wetted face of the felt prior to indenting and an interposed adhesive such as a thermoplastic resin adhesive may be used to secure the trim material to the body material. No rupture of the unindented areas which would result in a weakened structure will result when the present process is practiced. I have successfully formed trimmed door panels with mohair and whipcord fabric coverings, possessing a good appearance and adequate strength without need for stitching the fabric to the base.

While I have illustrated and described a preferred embodiment of my invention, the same may be otherwise embodied and practiced within the scope of the following claims.

I claim:

1. In a method of indenting felt paper having an initial density between about 9 and 15 pounds per cubic foot and containing from .5 to 3.5 pounds per cubic foot of the dried residue of rubber latex distributed substantially uniformly throughout the thickness of the sheet, the steps of applying moisture to the upper surface of said felt prior to indenting, and indenting said felt in limited areas only with a pressing surface heated to a temperature above 212° F.

2. In a method of indenting felt paper containing a minor amount of the dried residue of rubber latex distributed substantially uniformly throughout the thickness of the sheet, the steps of applying moisture to the upper surface at least of said felt immediately prior to indenting, and indenting said felt in limited areas only with a continuous pressing surface heated to a temperature above 212° F. to flash said moisture to steam.

3. In a method of indenting felt paper having an initial low density and containing from about .52 to 2.75 pounds per cubic foot of the dried residue of rubber latex distributed substantially uniformly throughout the thickness of the sheet, the steps of applying water to at least the upper surface of said felt immediately prior to indenting, and indenting said felt in limited areas only with a pressing surface directly engageable with the upper surface of the felt and heated to a temperature above 212° F. to flash said moisture to steam.

4. In a method of indenting felt paper having an initial density between about 9 and 15 pounds per cubic foot and containing from .5 to 3.5 pounds per cubic foot of the dried residue of rubber latex distributed substantially uniformly throughout the thickness of the sheet, the steps of applying moisture to substantially the entire upper surface of said felt immediately prior to indenting and indenting said felt in limited areas only with a pressing surface directly engageable with the upper surface of the felt throughout substantially the entire surface area thereof, flashing said moisture to steam substantially instantaneously upon the application of pressure, and maintaining said heat and pressure for a period of time sufficient to set said latex and hold the felt in indented condition.

5. In a method of indenting felt paper having an initial density between about 9 and 15 pounds per cubic foot and containing from .52 to 2.75 pounds per cubic foot of the dried residue of rubber latex distributed substantially uniformly throughout the thickness of the sheet, the steps of applying moisture to the upper surface of said felt prior to indenting and indenting the same substantially immediately thereafter in limited areas with substantially the entire surface area of one face thereof directly engageable with a pressing surface heated to a temperature between 212° F. and 300° F. to flash said moisture to steam, and continuing the application of pressure under heat until the latex has set in the indented areas to hold said indented areas at substantially their compressed thickness.

6. In a method of making a trim panel from a body of rag felt having a density in the order of 70 pounds determined on a ream basis of 480 square feet and an initial thickness in the order of .150" to .175", said felt being impregnated with the dried residue of rubber latex distributed substantially uniformly throughout the thickness of the felt on a basis of about 3 to 15 grams per square foot, the steps of spraying the upper surface of said felt body with water, indenting said felt in limited areas while so moistened with a pressing surface heated to temperature in the order of 250° F. and engageable with substantially the entire wetted surface of said felt body, and continuing the application of heat and pressure until the latex in the indented areas has set.

ARTHUR L. JENNINGS.

REFERENCES CITED

The following references are of record in the file of this patent:

UNITED STATES PATENTS

| Number | Name | Date |
| --- | --- | --- |
| 1,962,683 | Dreyfus | June 12, 1934 |
| 2,135,578 | Jarosik | Nov. 8, 1938 |
| 2,150,458 | Randall | Mar. 14, 1939 |

Certificate of Correction

Patent No. 2,432,993.  December 23, 1947.

ARTHUR L. JENNINGS

It is hereby certified that error appears in the printed specification of the above numbered patent requiring correction as follows: Column 5, line 1, for the word "identing" read *indenting*; and that the said Letters Patent should be read with this correction therein that the same may conform to the record of the case in the Patent Office.

Signed and sealed this 9th day of March, A. D. 1948.

[SEAL]

THOMAS F. MURPHY,
*Assistant Commissioner of Patents.*